US008461472B2

(12) United States Patent
Domschot

(10) Patent No.: US 8,461,472 B2
(45) Date of Patent: Jun. 11, 2013

(54) MODULAR WELDING EQUIPMENT WITH LIGHT CURTAINS

(75) Inventor: Bryan W. Domschot, Blissfield, MI (US)

(73) Assignee: Tec-Option, Inc., Blissfield, MI (US)

( * ) Notice: Subject to any disclaimer, the term of this patent is extended or adjusted under 35 U.S.C. 154(b) by 264 days.

(21) Appl. No.: 12/760,626

(22) Filed: Apr. 15, 2010

(65) Prior Publication Data

US 2010/0264124 A1     Oct. 21, 2010

Related U.S. Application Data

(60) Provisional application No. 61/169,561, filed on Apr. 15, 2009.

(51) Int. Cl.
*B23K 9/00* (2006.01)
(52) U.S. Cl.
USPC ............... 219/74; 219/121.13; 219/21.86; 219/124.31; 219/136; 219/158
(58) Field of Classification Search
USPC ............... 219/74, 121.13, 121.21, 121.43, 219/121.44, 121.45, 121.58, 121.63, 121.86, 219/124.1, 124.31, 125.1, 136, 137 R, 158
See application file for complete search history.

(56) References Cited

U.S. PATENT DOCUMENTS

| | | | |
|---|---|---|---|
| 6,161,752 A * | 12/2000 | Miyata et al. | 228/160 |
| 6,772,932 B1 * | 8/2004 | Halstead | 228/45 |
| 7,024,261 B1 * | 4/2006 | Tanton | 700/96 |
| 2005/0223549 A1 * | 10/2005 | Braun | 29/799 |

* cited by examiner

*Primary Examiner* — Steven Loke
*Assistant Examiner* — Cuong Nguyen
(74) *Attorney, Agent, or Firm* — Reising Ethington P.C.

(57) ABSTRACT

A welding machine that includes a machine frame having an opening permitting access to an interchangeable tooling module installed on the machine. The welding machine includes one or more light curtains covering the opening to disable operation of one or more welding stations on the tooling module if the light curtain is breached by an operator, robot, or other object. The welding machine includes a selector arm attached to the machine frame at a location between a first end and a second end of the opening. The selector arm can be moved into and out of position at the opening to selectively define either a single light curtain across the opening or a pair of adjacent light curtains that permit separate operation and access to separate welding stations behind each of the two light curtains.

18 Claims, 6 Drawing Sheets

MODULAR WELDING EQUIPMENT WITH LIGHT CURTAINS

CROSS-REFERENCE TO RELATED APPLICATION

This application claims the priority of U.S. Provisional Patent Application No. 61/169,561, filed Apr. 15, 2010, the entire contents of which are hereby incorporated by reference.

TECHNICAL FIELD

This invention relates generally to welding equipment and, in particular, to modular welding equipment that can be configured to weld more than one type of part.

BACKGROUND OF THE INVENTION

It has been a common practice in the welding machine industry to build welding machines with custom tooling as an integral part of the welding machine. In this practice, each machine is dedicated to the manufacture of a particular part and is not useable for manufacture of other parts. The working area of such a dedicated machine includes an attached assembly of fixtures and tools specifically made, located and adjusted to produce the parts to which the machine is dedicated. The entire machine, from heavy frame to built-in precision fixtures is treated as capital equipment on the financial books of the purchaser. When the parts produced by the dedicated machine are no longer needed, the entire machine is generally scrapped.

Previously, there had been a longstanding need in the industry to overcome the disadvantages which accompany the practice of using dedicated welding machines such as the economic loss from scrapping the entire machine when the tools and fixtures are no longer usable because of wear and tear or because of termination of production of the part to which the machine is dedicated. Solutions to this problem are disclosed in U.S. Pat. Nos. 6,271,496 and 6,512,195. These patents disclose electric welding machines that have base operating machines that can accept different tooling modules so that only the tooling module and not the entire welding machine can be replaced when switching between different welding programs or operations.

SUMMARY OF THE INVENTION

In one embodiment, the there is provided a welding machine that includes a machine frame having an opening permitting access to an interchangeable tooling module installed on the machine. The welding machine includes a selector arm attached to the machine frame at a location between a first end and a second end of the opening. The selector arm can be movable between a first position away from the opening to a second position at the opening. When the selector arm is in the first position, a first light curtain can span the opening. When the selector arm is in the second position, a first portion of the opening is defined by the first end of the opening and the selector arm and a second portion of the opening is defined by the second end of the opening and the selector arm. When the selector arm is in the second position, a second light curtain can span the first portion of the opening and a third light curtain can span the second portion of the opening. Placing the selector arm in the first position can enable the use of the first light curtain with a tooling module having one or more weld tooling stations. Placing the selector arm in the second position can enable the use of the second and third light curtains with one or more tooling modules having two weld tooling stations that are each independently accessible via one of the first and second portions of the opening.

In another embodiment, there is provided a welding machine that includes a machine frame which receives an interchangeable tooling module with the machine having an opening permitting operator access to at least one weld station of the tooling module when it is installed on the machine. The machine has one or more light transmitters and one or more light receivers wherein the one or more light transmitters and receivers are configured such that the welding machine can operate in a first mode in which a single light curtain spans the opening and can operate in a second mode in which a pair of separate light curtains each span a separate, adjacent portion of the opening.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The description that follows will describe exemplary embodiments of a modular welding machine constructed in accordance with the invention. The illustrated welding machine is especially adapted for use with electric welding machines of all types, but can be used in conjunction with other types of welders. This disclosure relates to various improvements to the modular welding machines disclosed in U.S. Pat. Nos. 6,271,496 and 6,512,195, that are assigned to the assignee hereof and that are hereby incorporated by reference in their entirety. It will be appreciated as the description proceeds that the invention is useful in a wide variety of applications and may be realized in many different embodiments.

FIGS. 1-6 illustrate various views and configurations of an embodiment 10. Reference will be made to each figure as necessary to describe this embodiment, as not all elements are visible in all views.

Figure 1:
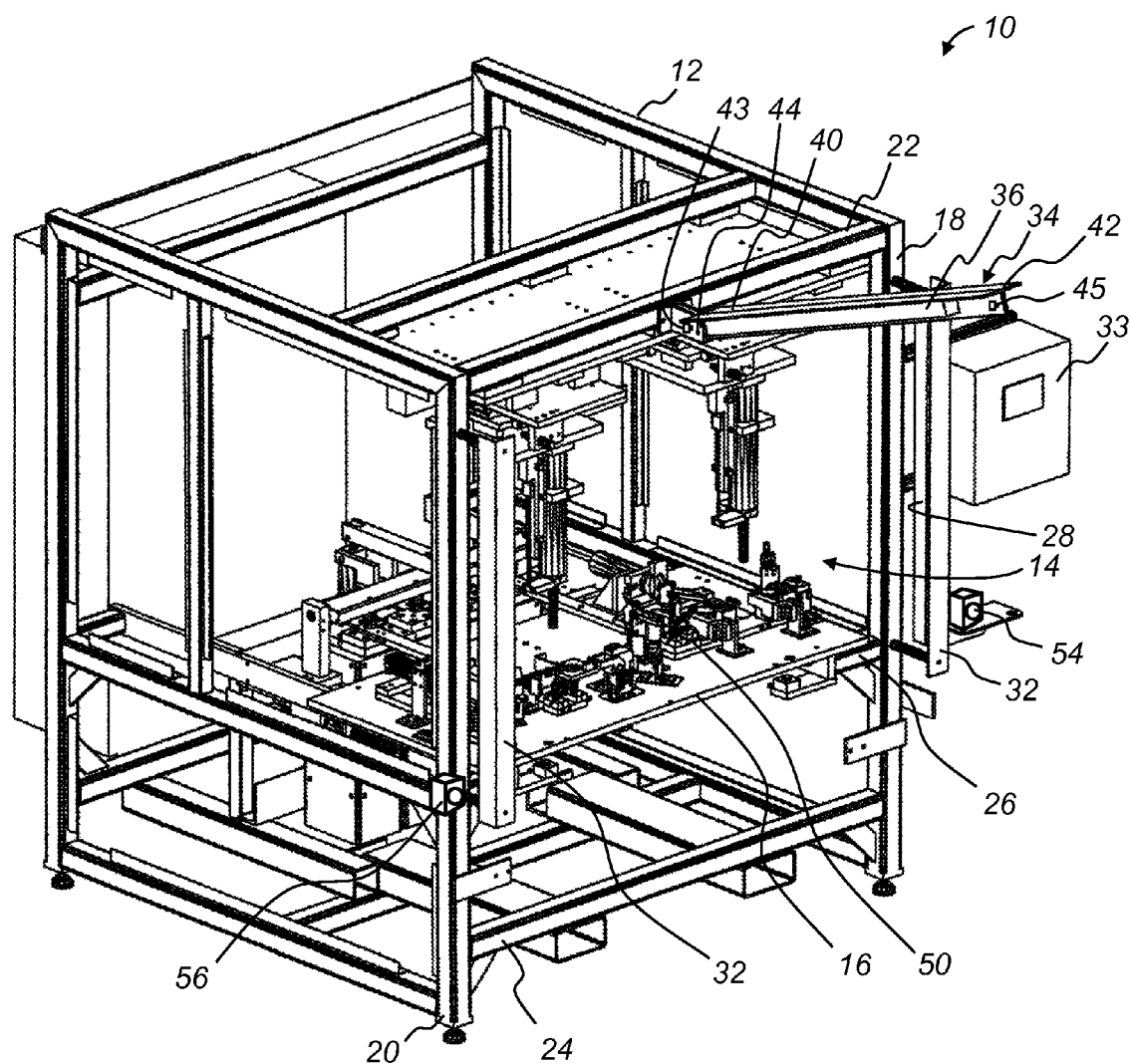
FIG. 1 illustrates a perspective view of an exemplary welding machine having a single weld tooling station installed therein.

Referring now to FIG. 1, an exemplary welding machine 10 is shown. The welding machine 10 includes a machine frame 12 having an opening 14 that permits access to a tooling module 16 installed on the welding machine 10. The tooling module 16 is interchangeable and can be installed and uninstalled through the opening 14. For this purpose the tooling cart arrangements disclosed in the above-identified patents, or that of U.S. Pat. No. 7,309,845, can be used. The machine frame 12 is generally comprised of a plurality of horizontal and vertical members assembled to provide a structure to support various other components of the welding machine 10. In this embodiment, the opening 14 has a first end generally defined by a right vertical member 18, a second end generally defined by a left vertical member 20, and an upper end generally defined by a horizontal member 22. A lower end of the opening 14 may also be defined by a lower horizontal member 24, by tooling module supports 26, or by a floor upon which the welding machine 10 rests.

Figure 2:
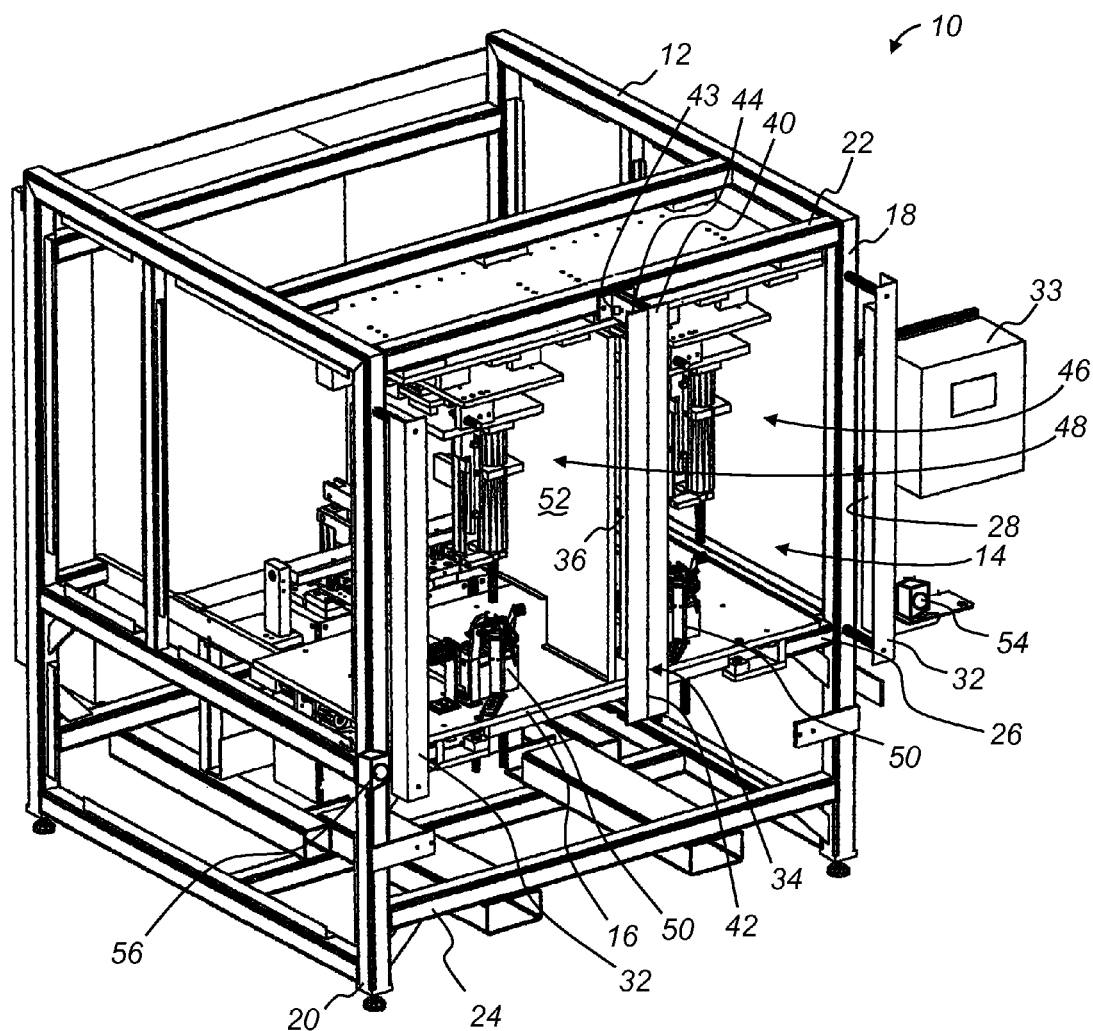
FIG. 2 illustrates a perspective view of the welding machine of FIG. 1 having two weld tooling stations installed therein.
Figure 3:
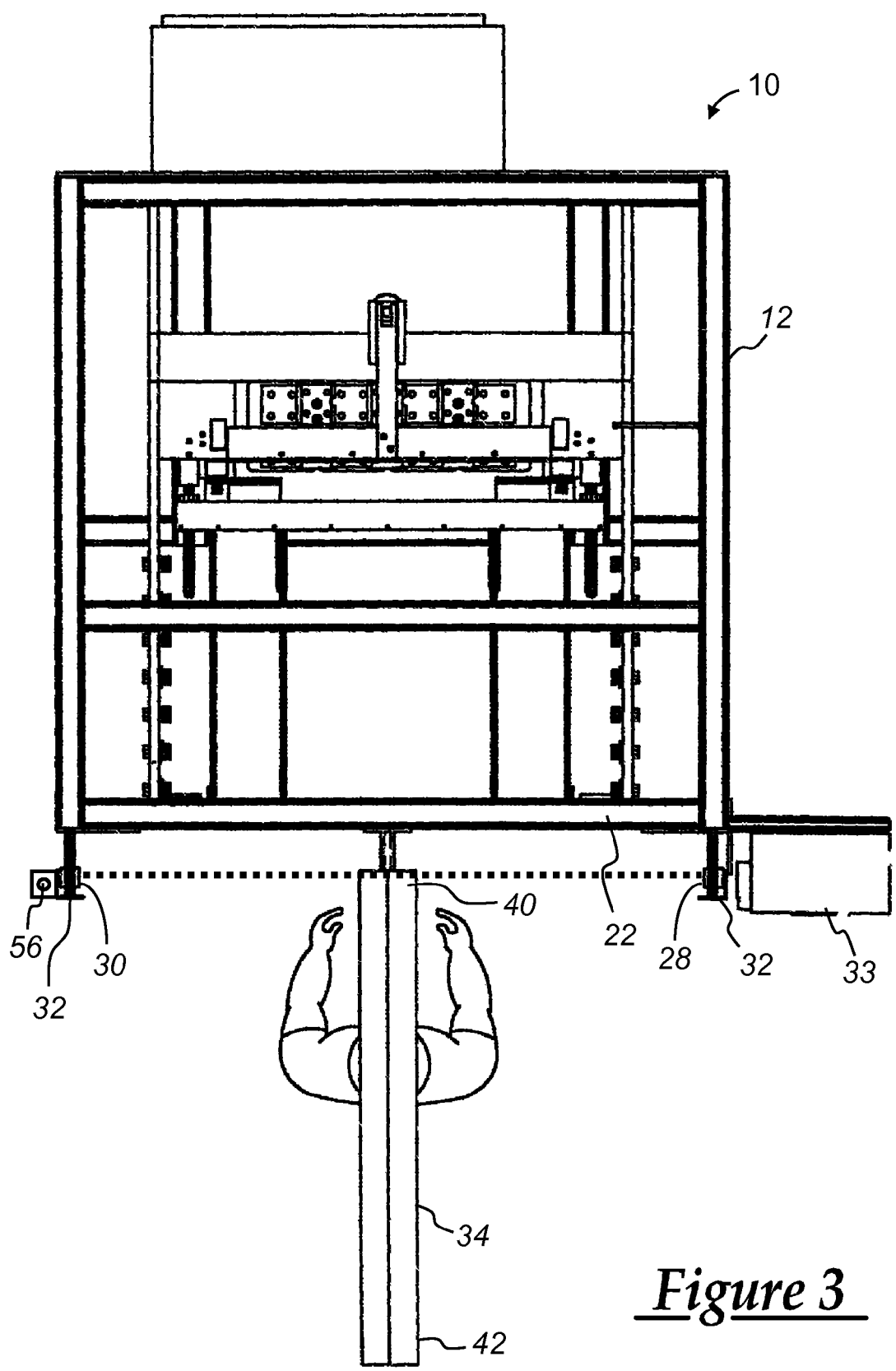
FIG. 3 illustrates a plan view of the welding machine of FIG. 1 configured to receive a tooling module.
Figure 4:
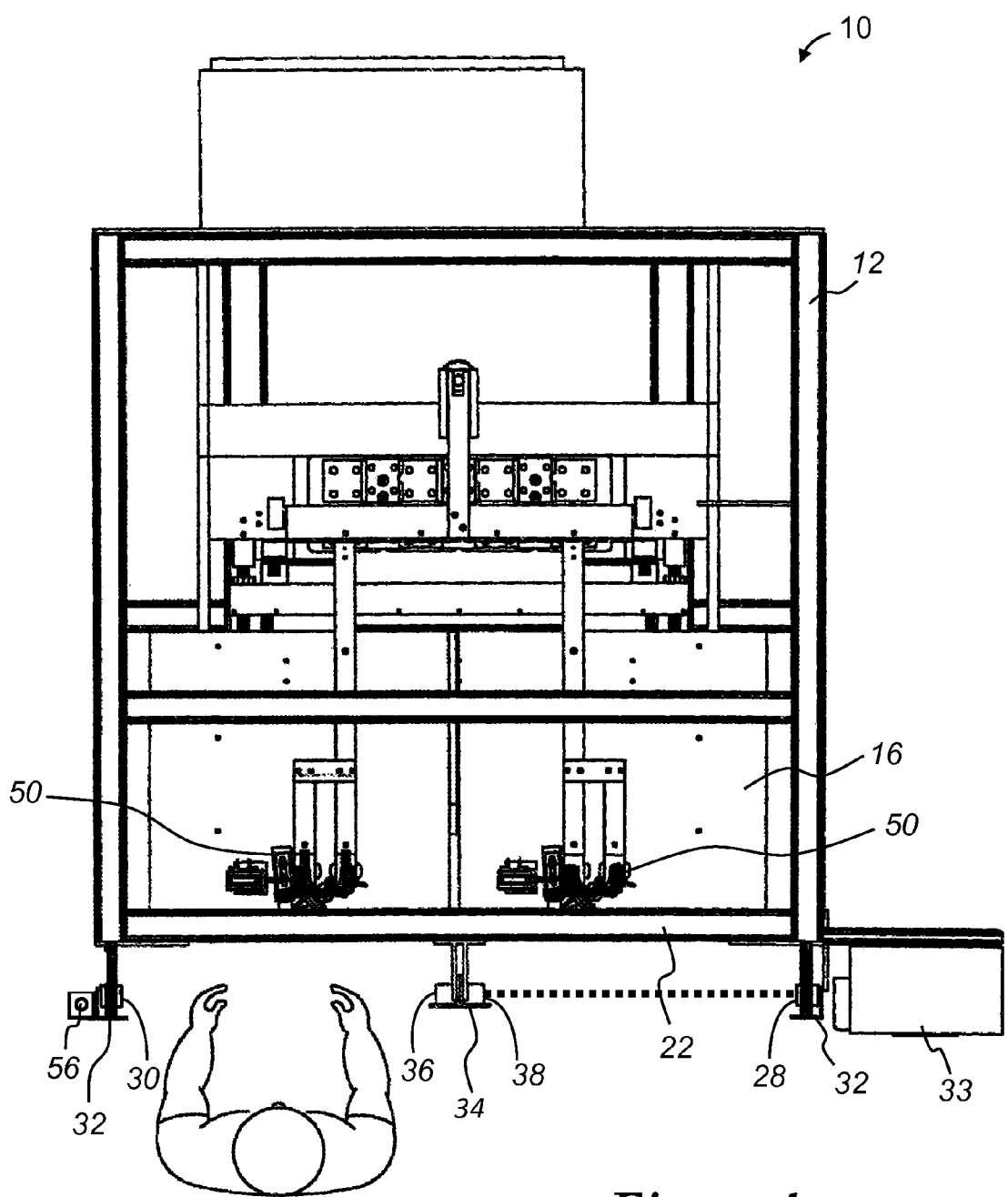
FIG. 4 illustrates a plan view of the welding machine of FIG. 1 having two weld tooling stations installed therein.

The exemplary welding machine 10 also includes a selector arm 34 attached to the machine frame 12 at a location between the first end and the second end of the opening 14. The selector arm 34 may be movable from a first position that is away from the opening 14 to a second position that is at the opening 14. The first position is best illustrated in FIGS. 1, 3, 5, and 6, and the second position is best illustrated in FIGS. 2 and 4. As illustrated in this embodiment the selector arm 34 has an upper end 40 and a lower end 42 and is attached to the machine frame 12 with a pivot 44 at the upper end 40 of the selector arm 34. Of course, other first positions are possible. For example, the selector arm 34 could simply be removed from the machine frame 12 or the selector arm 34 could be away from the opening 14 in any number of locations such that a first light curtain can span the opening 14 and be activated, as will be described further herein. Attachments other than the pivot 44 are also possible, or the pivot 44 can be located elsewhere on the machine frame 12 and/or on the selector arm 34. Movement of the selector arm between the first and second positions can be manual or automatic, such as under control of the PLC 33.

In one embodiment, a first light transmitter 28 is attached to the first end of the opening 14 and a first light receiver 30 is attached to the second end of the opening 14. The first light transmitter 28 and first light receiver 30 are shown in the figures to include guards 32. Therefore in FIG. 1, the portion of the first light receiver 30 that receives light from the first light transmitter 28 is not shown. This is best shown in FIG. 3, where the dashed line represents an overhead view of one or more light beams. The first light curtain spans opening 14 and is formed between the first light transmitter 28 and the first light receiver 30. The selector arm 34 can include a second light transmitter 36 and a second light receiver 38 mounted thereon. The light curtain is used as a safety device such that when the light curtain is active, meaning that one or more light beams are being transmitted from the light transmitter, the light receiver is continuously or repetitively detecting whether or not the light beams are being received. If one or more transmitted light beams are not detected at any given time, a signal can be sent to a programmable logic controller PLC 33 or other device controlling operation of the welding equipment to indicate that there may be an obstruction between the light transmitter and the light receiver. The control device can then send or prevent other signals to other parts of the equipment to disable operation of the weld tooling or other portions of the equipment. Thus, when the first light curtain is active, it can detect when a human operator or other foreign object is entering an area of the machine where the tooling module 16 is installed and send a signal to the PLC 33 to take the appropriate action, such as halting a welding cycle that may be in progress. The first light curtain may also be inactive to allow the human operator or other equipment to enter the area of the machine where the tooling module 16 is installed. This may be necessary to allow the operator to load and unload parts to be welded, for example. The control device may be programmed or configured to activate the first light curtain while the welding cycle is in progress and to deactivate the first light curtain while a welding cycle is not in progress.

In this embodiment, the first light curtain is formed between the first light transmitter 28 and the first light receiver 30 when the selector arm 34 is in the first position. When the selector arm 34 is in the second position, two different light curtains can be formed. As is best shown in the overhead view of FIG. 4, a second light curtain can be formed between the first light transmitter 28 and the second light receiver 38 that spans a first portion 46 of the opening 14. And a third light curtain can be formed between the second light transmitter 36 and first light receiver 30 that spans a second portion 48 of the opening 14. Thus, the selector arm 34 in this embodiment is constructed such that the second light receiver 38 is positioned to receive one or more light beams from the first light transmitter 28 when the selector arm 34 is in the second position. And the selector arm 34 is constructed such that the second light transmitter 36 is positioned to transmit one or more light beams to be received by the first light receiver 30 when the selector arm 34 is in the second position. As shown in the figures, the selector arm 34 may divide the opening 14 into approximately equal first and second portions 46, 48 when it is in the second position, but the location of the selector arm 34 could also be such that it divides the opening 14 into different sized first and second portions 46, 48.

In other embodiments, the light curtains can be formed in other ways using light transmitter-receivers and, in some cases, reflectors. A light transmitter-receiver can generally be described as a device that both transmits one or more light beams and receives light beam(s). A light transmitter-receiver can receive light beams from another light transmitter-receiver, or can receive reflected light beams that it has itself transmitted. Generally, with such an arrangement, the one or more light beams are transmitted from the light transmitter-receiver and directed at a reflector or at another light transmitter-receiver. Where a reflector is used, it is arranged to reflect the light beam(s) back to the light transmitter-receiver, which is continuously or repetitively detecting whether or not the light beam(s) are being received. The light transmitter-receiver can be an integrated device that includes pairings of individual light transmitting elements and individual light receiving elements, wherein each light receiving element receives a light beam from a dedicated light transmitting element, either directly or reflected. Alternatively, the light transmitter-receiver can include a light transmitter and a light receiver positioned adjacent to one another and arranged so that light beams originating from the light transmitter are reflected by the reflector to be received by the light receiver or so that the light beams originating from one light transmitter reach the light receiver of another light transmitter-receiver. The reflector can be a mirror or any other suitable element having a sufficiently reflective surface. Of course, various other combinations of light transmitting, receiving, and reflecting elements can be used to form light curtains.

Figure 7:
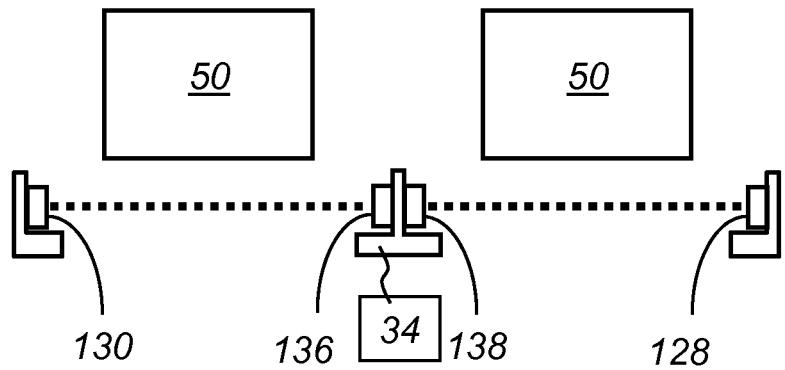
FIG. 7 illustrates a simplified plan view of an embodiment of the welding machine of FIG. 1 that includes light transmitter-receivers and reflectors.

In one embodiment, depicted in a simplified overhead view in FIG. 7 with selector arm 34 in the second position, a first light transmitter-receiver 128 can be attached to the first end of the opening 14, and a first reflector 130 can be attached to the second end of the opening 14. The first light curtain can be formed between the first light transmitter-receiver 128 and the first reflector 130 when the selector arm 34 is in the first position. Also in this embodiment, a second light transmitter-receiver 136 and a second reflector 138 can be mounted on the selector arm 34. The second light transmitter-receiver 136 and the second reflector 138 are arranged such that when the selector arm 34 is in the second position, as shown, the second light curtain can be formed between the first light transmitter-receiver 128 and the second reflector 138, and the third light curtain can be formed between the second light transmitter-receiver 136 and the first reflector 130. The second and third light curtains are depicted in FIG. 7 as a dashed line.

Figure 8:
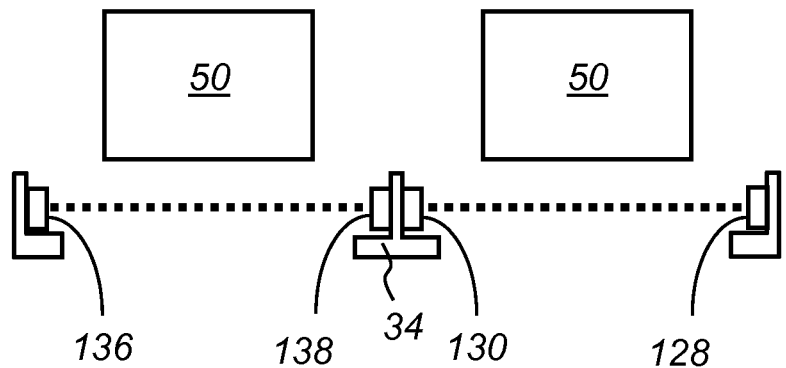
FIG. 8 illustrates a simplified plan view of another embodiment of the welding machine of FIG. 1 that includes light transmitter-receivers and reflectors.

In another embodiment, depicted in a simplified overhead view in FIG. 8 with selector arm 34 in the second position, the first light transmitter-receiver 128 can be attached to the first end of the opening 14, and the second light transmitter-receiver 136 can be attached to the second end of the opening 14. The first light curtain can be formed between the first light transmitter-receiver 128 and the second light transmitter-receiver 136 when the selector arm 34 is in the first position. Also in this embodiment, the first reflector 130 and the second reflector 138 can be mounted on the selector arm 34. The first reflector 130 and the second reflector 138 are arranged such that when the selector arm 34 is in the second position, as shown, the second light curtain can be formed between the first light transmitter-receiver 128 and the first reflector 130, and the third light curtain can be formed between the second light transmitter-receiver 136 and the second reflector 138. The second and third light curtains are depicted in FIG. 8 as a dashed line. The first, second, and third light curtains operate substantially the same as previously described, regardless of the elements they are formed between. In particular, if one or more transmitted light beams are not detected at any given time by the appropriate light receiver or light transmitter-receiver, a signal can be sent to the programmable logic controller PLC 33 or other device controlling operation of the welding equipment to indicate that there may be an obstruction. The control device can then send or prevent other signals to other parts of the equipment to disable operation of the weld tooling or other portions of the equipment.

Figure 5:
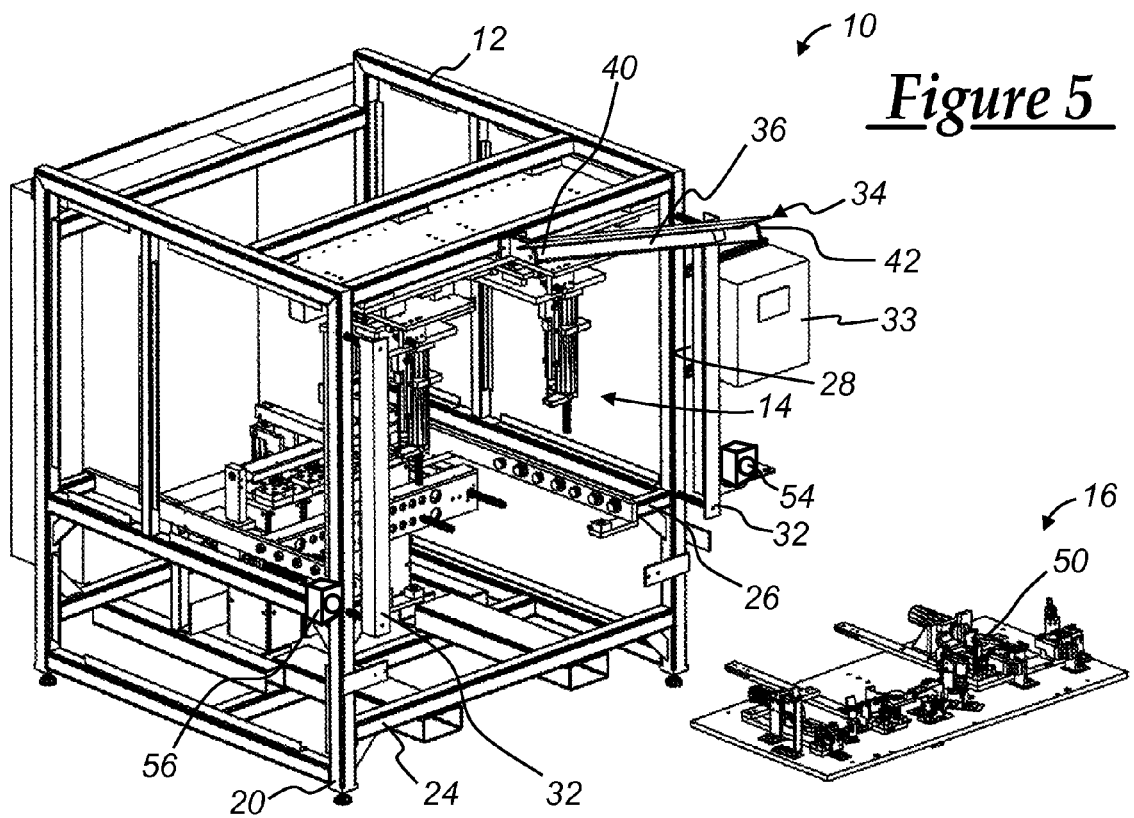
FIG. 5 illustrates a perspective view of the welding machine of FIG. 1 and an uninstalled tooling module having one set of weld tooling.
Figure 6:
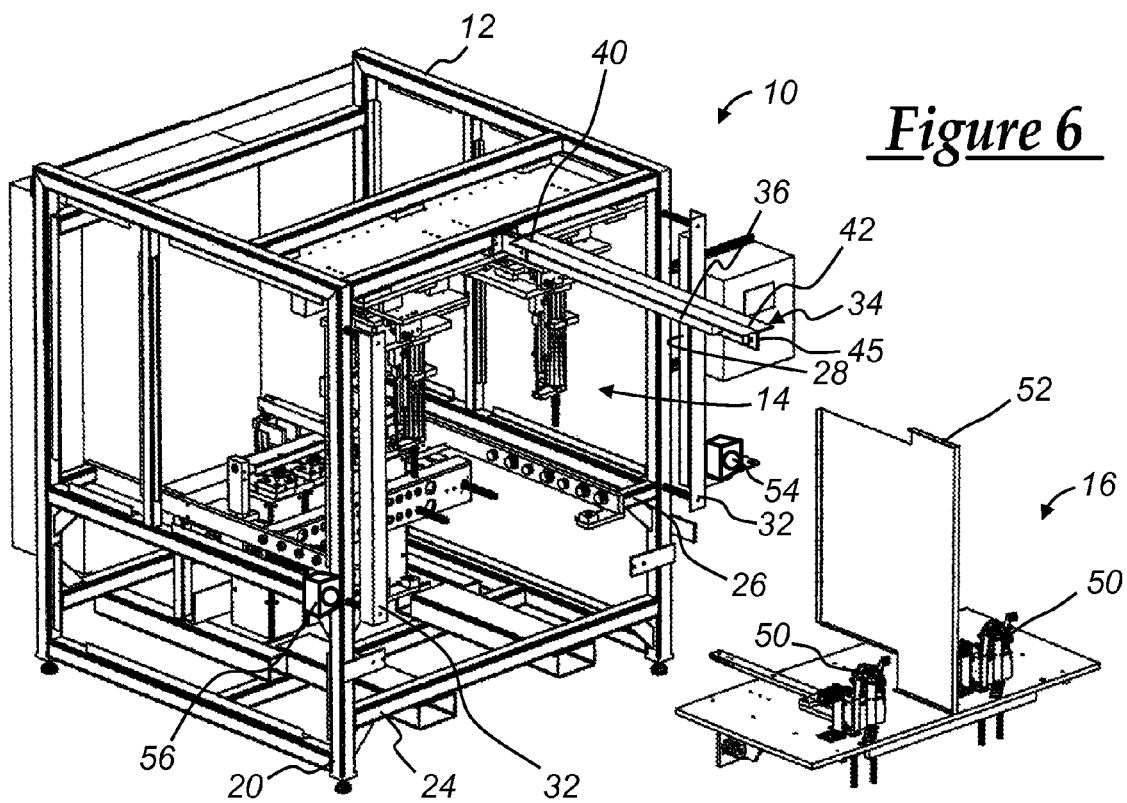
FIG. 6 illustrates a perspective view of the welding machine of FIG. 1 and an uninstalled tooling module having two sets of weld tooling.

The selector arm 34 serves multiple functions for the welding machine 10. It can facilitate the use of the welding machine 10 with a variety of interchangeable tooling modules 16. In particular, the selector arm 34 can be placed in the first position to enable the use of the first light curtain with a tooling module 16 having a single weld tooling station 50. This configuration is best shown in FIG. 1, and an example of an uninstalled tooling module 16 having a single weld tooling station 50 is shown in FIG. 5. Alternatively, the selector arm 34 can be placed in the second position to enable use of the second and third light curtains with a tooling module 16 having two weld tooling stations 50 that are independently accessible via one of the first and second portions 46, 48 of the opening 14. This configuration is best shown in FIGS. 2 and 4, and an example of an uninstalled tooling module 16 having two weld tooling stations 50 is shown in FIG. 6. A tooling module 16 having two weld tooling stations 50 may also include a partition 52 to separate the tooling stations and further facilitate safe independent access of the weld tooling stations 50 by the operator or other equipment.

The independently accessible nature of the two weld tooling stations 50 can be further understood when considered in conjunction with the operation of the second and third light curtains that span the first and second portions 46, 48 of the opening 14. A typical part welding cycle may generally be described as including the following steps: part loading, part welding, and part unloading. The loading and unloading steps require the operator or other equipment to access the weld tooling station 50 where the welding takes place. The welding step may pose a safety risk for the operator due to the presence of high electric currents and heat generated during welding. During this step it is desirable to activate the light curtain that spans the opening 14 or portion of the opening 14 through which the operator accesses the weld tooling station 50 with which he is working. Thus, if the operator mistakenly attempts to access the weld tooling station 50 while the part welding step is occurring, the light curtain can send a signal to the control device to take an appropriate safety action.

When the selector arm 34 of the illustrated welding machine 10 is in the first position with a tooling module 16 having a single weld tooling station 50 installed, the first light curtain is deactivated while the operator loads the part or parts to be welded. The first light curtain is then activated while the welding step occurs. The first light curtain is again deactivated while the operator unloads the part or parts that have been welded. In this configuration, the operator spends idle time waiting for the welding step to occur.

When the selector arm 34 is in the second position with a tooling module 16 having two weld tooling stations 50 installed, the operator can access one of the two weld tooling stations 50 via one of the first and second portions 46, 48 of the opening 14 while the welding step is occurring at the other of the two weld tooling stations 50. For example, the operator can load a part or parts onto one of the two weld tooling stations 50 through the first portion 46 of the opening 14 while the second light curtain is deactivated. The second light curtain can then be activated, and the welding step can commence at the one of the two weld tooling stations 50. While the welding step is occurring at the one weld tooling station 50, the third light curtain can be deactivated so that the operator can load a part or parts onto the other of the two weld tooling stations 50 through the second portion 48 of the opening 14. The third light curtain can then be activated, and the welding step can commence at the other of the two weld tooling stations 50. While the welding step is occurring at the other of the two weld tooling stations 50, the second light curtain can again be deactivated so that the operator can unload the finished welded part or parts through the first portion 46 of the opening 14 and load another part or parts onto the one of the two weld tooling stations 50. Repeating these steps with the selector arm 34 in the second position with a tooling module 16 having two weld tooling stations 50 installed can thereby eliminate the idle time of the operator that may occur when the selector arm 34 is in the first position with a tooling module 16 having a single weld tooling station 50 installed. Thus, the two weld tooling stations 50 in this configuration are independently accessible by the independent control of access to the two weld tooling stations 50 via independent operation of the second and third light curtains.

The selector arm 34 may also interact with one or more sensors such as switches to indicate whether the selector arm 34 is in the first position or the second position. For example, a first switch 43 may be located near the pivot 44 and positioned such that it changes from a first state to a second state when the selector arm 34 is moved from the first position to the second position. The first switch 43 can be one of several known varieties of micro-switches, proximity switches, or other types of switches. Whether the first switch is at the first state or second state can indicate to the welding machine control device or PLC whether the selector arm 34 is in the first position or second position. Accordingly, the control device can pair the proper light transmitters, light receivers, and/or light transmitter-receivers to form the first, second, and third light curtains as previously described based on the state of the first switch. In other words, the state of the first switch 43 can indicate to the control device which light receiver or light transmitter-receiver should be configured to receive light beams from each light transmitter or light transmitter-receiver, if any. A second switch 45, also selected from many known varieties of switches, may be used for verification that the selector arm 34 is in the position indicated by the first switch. For example, when the first switch 43 is at the second state, it may only indicate that the selector arm 34 is not in the first position, but not yet in the second position. The second switch 45 can be located near the first switch or elsewhere, such as near the lower end 42 of the selector arm 34, and positioned so that it also changes from a first state to a second state when the selector arm 34 is moved from the first position to the second position. Having a first and second switch thus arranged can identify situations in which the selector arm 34 is somewhere between the first and second positions so that the control device does not pair any of the light transmitters, light receivers, or light transmitter-receivers with one another until they are in their proper positions.

It will thus be appreciated that the welding machine 10 can operate in either of at least two modes: one in which a single light curtain is provided across the opening 14 and another in which a pair of separate, adjacent light curtains together span the opening 14. The operating mode used by the machine can be automatically selected based on the selector arm position, as discussed above. Alternatively, some other automatic or manual means of setting the machine operating mode can be used.

As indicated in FIGS. 1, 2, 5, and 6, the welding machine 10 may also include first and second cycle start switches 54, 56. These cycle start switches are utilized by the operator to activate the appropriate light curtain and start the welding step of each weld cycle. For example, when the selector arm 34 is in the first position, either one or both of the first and second cycle start switches 54, 56 can be used to send a signal to the control device to activate the first light curtain and to start the welding step. When the selector arm 34 is in the second position, the first cycle start switch 54 can send a signal to the control device to activate the second light curtain and to start the welding step at the weld tooling station 50 accessible through the first portion 46 of the opening 14. The second cycle start switch 56 can send a signal to the control device to activate the third light curtain and to start the welding step at the weld tooling station 50 accessible through the second portion 48 of the opening 14.

Many variations of the welding machine 10 described herein are possible. For example, in embodiments in which two weld tooling stations 50 are installed in the welding machine 10, it is possible that each of the two weld tooling stations 50 be included as a part of two separate tooling modules 16. Additionally, it is possible that the welding machine 10 herein described includes a first and a second selector arm having second and third light transmitters and receivers configured to divide the opening 14 into up to three portions to facilitate up to three independently accessible weld tooling stations 50. The number of selector arms and maximum number of independently accessible weld tooling stations is not limited.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A welding machine, comprising:
a machine frame having an opening permitting access to an interchangeable tooling module having one or more weld tooling stations installed on said machine;
a selector arm attached to the machine frame at a location between a first end of the opening and a second end of the opening, the selector arm being movable from a first position away from the opening to a second position at the opening;
wherein, when the selector arm is in the first position, a first light curtain spans the opening;
wherein, when the selector arm is in the second position, a first portion of the opening is defined by the first end of the opening and the selector arm, and a second portion of the opening is defined by the second end of the opening and the selector arm, and a second light curtain spans the first portion of the opening, and a third light curtain spans the second portion of the opening; and
wherein the selector arm can be placed in the first position to enable use of the first light curtain with the interchangeable tooling module and can be placed in the second position to enable use of the second and third light curtains with one or more interchangeable tooling modules having two weld tooling stations that are each independently accessible via one of the first and second portions of the opening.

2. A welding machine as defined in claim 1, further comprising:
a first light transmitter attached to the first end of the opening and a first light receiver attached to the second end of the opening;
a second light transmitter and a second light receiver mounted on the selector arm;
wherein, when the selector arm is in the first position, the first light curtain is formed between the first light transmitter and the first light receiver; and
wherein, when the selector arm is in the second position, the second light curtain is formed between the first light transmitter and the second light receiver and the third light curtain is formed between the second light transmitter and the first light receiver.

3. A welding machine as defined in claim 1, further comprising:
a first light transmitter-receiver attached to the first end of the opening and a first reflector attached to the second end of the opening;
a second light transmitter-receiver and a second reflector mounted on the selector arm;

wherein, when the selector arm is in the first position, the first light curtain is formed between the first light transmitter-receiver and the first reflector; and wherein, when the selector arm is in the second position, the second light curtain is formed between the first light transmitter-receiver and the second reflector and the third light curtain is formed between the second light transmitter-receiver and the first reflector.

4. A welding machine as defined in claim 1, further comprising:
a first light transmitter-receiver attached to the first end of the opening and a second light transmitter-receiver attached to the second end of the opening;
a first reflector and a second reflector mounted on the selector arm;
wherein, when the selector arm is in the first position, the first light curtain is formed between the first light transmitter-receiver and the second light transmitter-receiver; and
wherein, when the selector arm is in the second position, the second light curtain is formed between the first light transmitter-receiver and the first reflector and the third light curtain is formed between the second light transmitter-receiver and the second reflector.

5. A welding machine as defined in claim 1, further comprising the interchangeable tooling module.

6. A welding machine as defined in claim 5, wherein the interchangeable tooling module includes a single weld station.

7. A welding machine as defined in claim 5, wherein the interchangeable tooling module includes a pair of weld stations.

8. A welding machine as defined in claim 7, wherein the interchangeable tooling module includes a partition separating the weld stations.

9. A welding machine as defined in claim 1, further comprising at least one sensor indicative of the selector arm position, and wherein the welding machine is operable in response to the sensor to operate in either a first mode in which the first light curtain is provided across the opening, or in a second in which the second and third light curtains are provided across the opening.

10. A welding machine as defined in claim 9, wherein the sensor comprises a switch.

11. A welding machine, comprising:
a machine frame that receives an interchangeable tooling module and having an opening permitting operator access to at least one weld station of the interchangeable tooling module when it is installed on said machine;
said machine having one or more light transmitters and one or more light receivers wherein the one or more light transmitters and receivers are configured such that said welding machine can operate in a first mode in which a single light curtain spans the opening and can operate in a second mode in which a pair of separate light curtains each span a separate, adjacent portion of the opening;
wherein, when operating in the second mode, said machine is operable to separately activate and deactivate each of the pair of separate light curtains to thereby permit one of the separate light curtains to be activated at one of the portions of the opening while the other separate light curtain is deactivated at the other portion of the opening to thereby permit operator access to said machine through that other portion.

12. A welding machine as defined in claim 11, further comprising a selector arm attached to the machine frame at a location between a first end of the opening and a second end of the opening, the selector arm being movable from a first position away from the opening to a second position at the opening.

13. A welding machine as defined in claim 12, wherein said welding machine operates in the first mode when the selector arm is in its first position, and operates in the second mode when the selector arm is in its second position.

14. A welding machine as defined in claim 11, wherein the light curtains extend horizontally across the opening.

15. A welding machine as defined in claim 11, further comprising the interchangeable tooling module.

16. A welding machine as defined in claim 15, wherein the interchangeable tooling module includes a single weld station.

17. A welding machine as defined in claim 15, wherein the interchangeable tooling module includes a pair of weld stations.

18. A welding machine as defined in claim 17, wherein the interchangeable tooling module includes a partition separating the weld stations.

* * * * *